Aug. 8, 1933.　　A. W. STEVENS ET AL　　1,921,012
PHOTOGRAPHIC FILM DEVELOPING APPARATUS
Filed April 6, 1931　　5 Sheets-Sheet 1
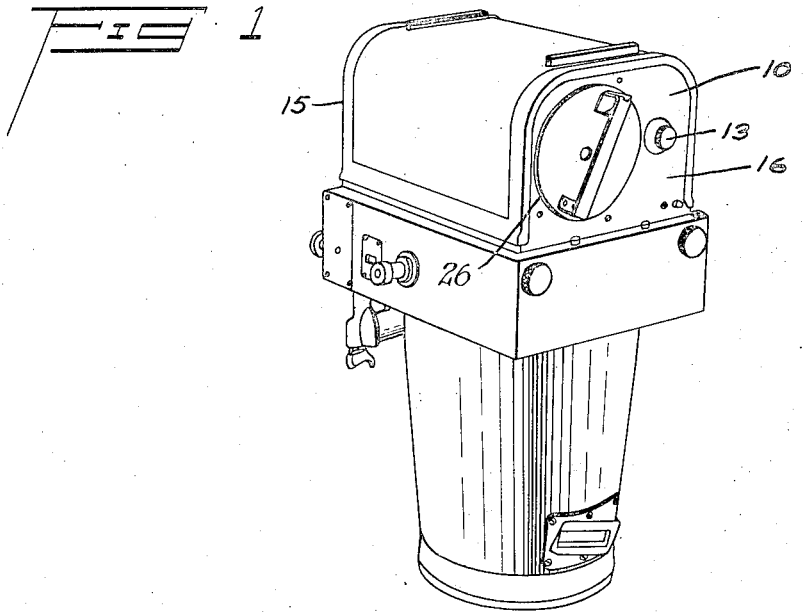
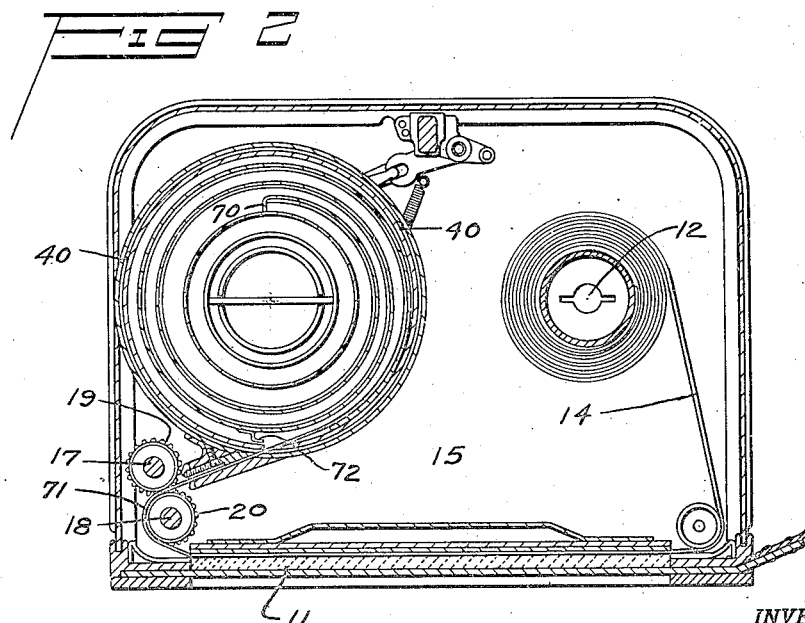
INVENTORS
ALBERT W STEVENS
WILLIAM H RICHARDS
BY
ATTORNEY Aug. 8, 1933.  A. W. STEVENS ET AL  1,921,012
PHOTOGRAPHIC FILM DEVELOPING APPARATUS
Filed April 6, 1931   5 Sheets-Sheet 2

INVENTORS
ALBERT W STEVENS
WILLIAM H RICHARDS
BY
ATTORNEY

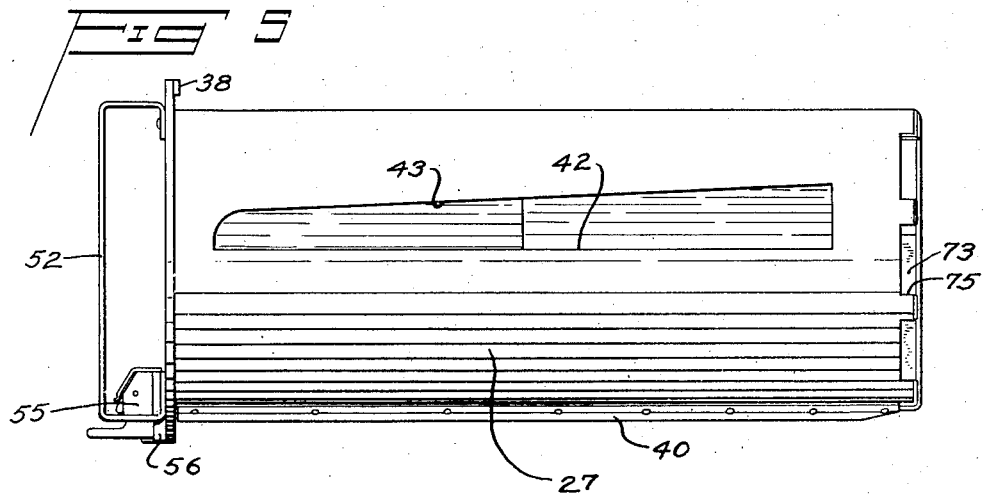
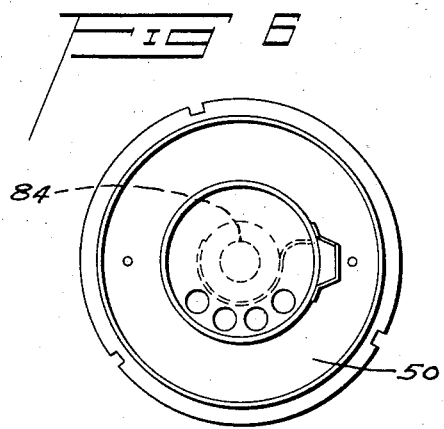
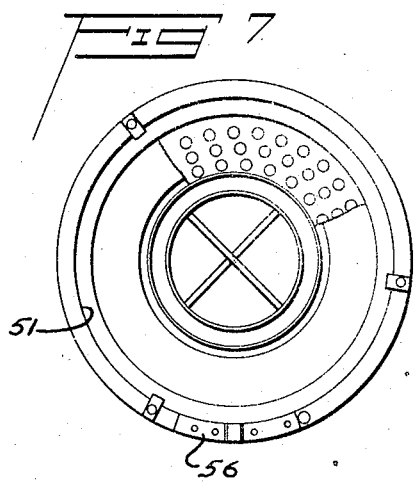

Aug. 8, 1933.   A. W. STEVENS ET AL   1,921,012
PHOTOGRAPHIC FILM DEVELOPING APPARATUS
Filed April 6, 1931    5 Sheets-Sheet 4
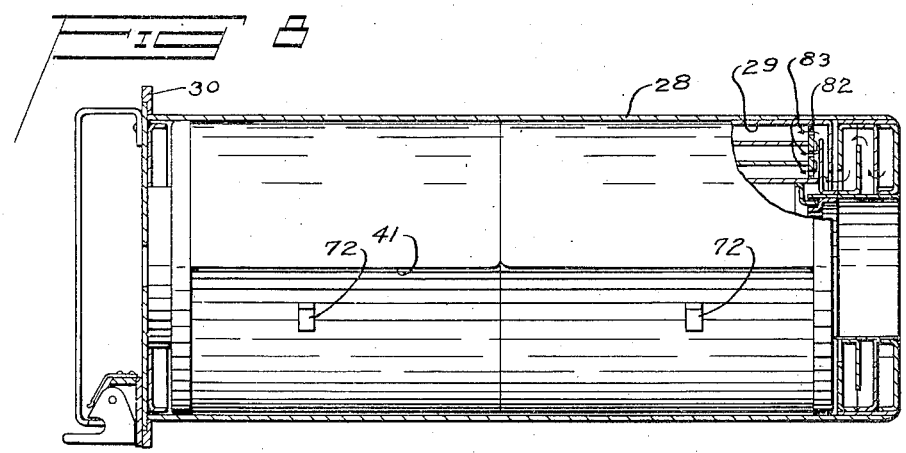
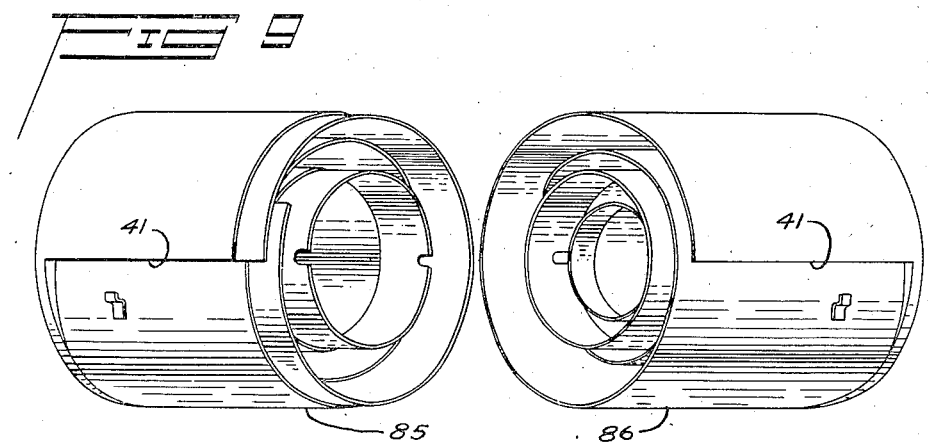
INVENTORS
ALBERT W STEVENS
WILLIAM H RICHARDS
BY
ATTORNEY

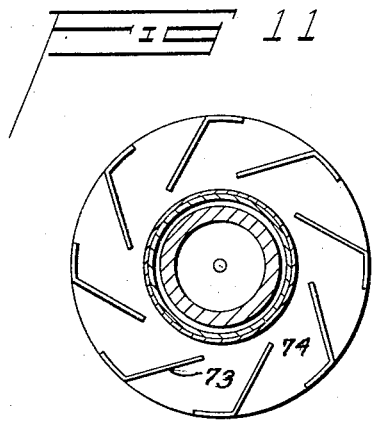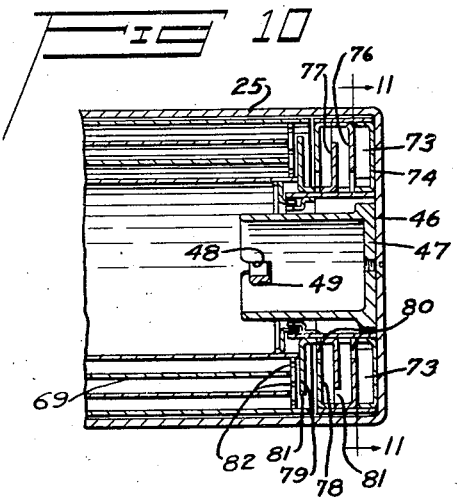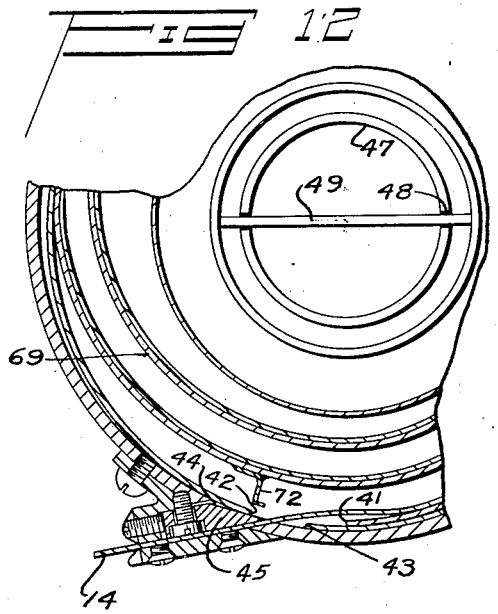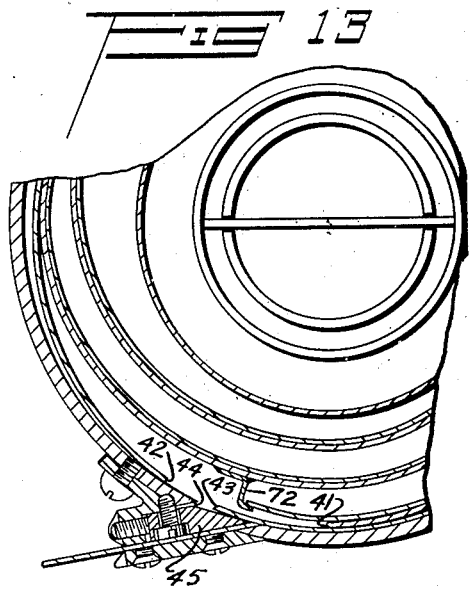

UNITED STATES PATENT OFFICE 1,921,012

PHOTOGRAPHIC FILM DEVELOPING APPARATUS

Albert W. Stevens and William H. Richards, Dayton, Ohio

Application April 6, 1931. Serial No. 528,076

31 Claims. (Cl. 95—90.5)

(Granted under the Act of March 3, 1883, as amended April 30, 1928; 370 O. G. 757)

The invention described herein may be manufactured and used by or for the Government for governmental purposes, without the payment to us of any royalty thereon.

The present invention relates generally to photography and more particularly to photographic apparatus which is especially adapted for quick work daylight development of a film or films after their exposure.

The primary object of the present invention is to provide simple and compact means which may be associated with, or made an associate part of a camera for receiving and containing in convenient form the exposed portions of photographic films of any desired length and furthermore to provide in a device of this character additional means to permit of the rapid development of the films while contained in said receiving means, which same may be accomplished in the daytime or in the light without requiring the use of a dark room.

Another object of the present invention is to provide in a camera a film container into which the film may be automatically advanced after exposure and separated from the unused sensitized portion of the film roll, and furthermore to provide in such film container a light-proof closure device which when closing to exclude the light from the interior of the container simultaneously shears from the film roll the exposed portion within the container.

Another object of the present invention is to provide a light-proof film container or receptacle so constructed that the exposed portion of the film may, without liklihood of injury thereto or without liklihood of injury to the unexposed portion of the film remaining in the camera, be readily and quickly removable from the camera as a unit in the daytime or in the light, and also to provide a receptacle or film container of such character that it may be readily installed and used in connection with substantially conventional types of film containing cameras.

A further object of the present invention is to provide a film container which generally comprises two complemental members, preferably cylindrical in form and having registerable openings in the side walls thereof for receiving within the container desired lengths of exposed photographic films, one of said members being provided with means in the form of a helical coil wherein the film in being fed into the interior of the container coils itself in conformity with the curvature of the coil, the other member being provided with suitable cooperating means which functions to not only prevent light rays from entering the interior of the container, but which means also serves the purpose of providing a passage which permits liquids to flow into or exhaust out of the interior of said container very rapidly.

As a consequence, by providing a container with a lightproof passage constructed in the manner of the present invention, the entire process of developing, washing and fixing of the negatives may be accomplished very rapidly and without it being necessary to remove the film from the receptacle or without exposing the film to any possible light rays during the several steps necessary in producing the negatives.

The invention further contemplates construction of a film developing container or receptacle which is especially adapted for carrying out the process of developing the films retained in said receptacle without requiring the removal of the film during any step of the developing process, which same may be effected in daylight without requiring the use of the conventional dark room and to associate the foregoing features with means for supporting or suspending the exposed film portions in the helical coil carried within the container so that the spaces between the convolutions of the film are practically unobstructed and the developing fluid will therefore be readily accessible to the emulsion side of the film, and in the preferred arrangement the coil is so constructed that it will maintain the film so positioned that there will be no liability of the emulsion side of the film being engaged or contacting with any part or associated parts of the coil, or to prevent one part of the emulsion side from contacting with any other part or parts of the coiled surface. By this means the developing, fixing and washing fluids will be freely accessible to the entire emulsion side of the film, so that when the container is immersed in the developing solution the uniformity of the action will be most pronounced as a result of the rapidity with which the developing fluid enters and leaves the container.

A further object of the present invention is to provide a film container which comprises two complemental members, one of which members is adapted to be relatively fixed with respect to the other member when mounted in the camera. The other member being adapted to be rotatable relative to the fixed member and to the camera after desired lengths of film have been fed into the container and to cooperate the foregoing with suitable shearing means provided in the camera to sever the exposed portion of the film from the unexposed portion and permit removal of the exposed film and container from the camera, suitable mechanism being provided in the camera and cooperating with the container whereby to permit removal of the film only after predetermined lengths of film have been fed into the container; the form of construction of the container furthermore lends itself to the employment of a relatively simple and inexpensive construction of shutter or light-proof closure by providing in the peripheral walls of the complemental members two registerable openings through which the film is fed into the container, which openings are closed when the one member is rotated relative to the other to thereby seal the openings and prevent light from entering therethrough.

A still further object of the present invention is to provide in a receptacle of this character an inner coil supporting member, which is generally cylindrical in form and provided with a rectangular opening into which the film is adapted to be fed into the coil supported therein, the said member and coil comprising two separable halved portions adapted to be readily separated to thereby easily remove the film coiled therein after its development and prevent the scratching of the emulsion.

Heretofore in producing negatives on films, it has been necessary to remove the films from the camera after exposure in a dark room and immerse them in trays or tanks containing the necessary developing solutions to carry on the process of producing negatives, which incidentally require considerable room, unusual care and ofttimes long delay in producing negatives due to the lack of necessary facilities required in a dark room. On the other hand, by providing a camera with a film developing receptacle constructed in accordance with the principles of our invention, the trays or tanks for carrying out the process of development may be carried to the place of exposure of the films and the negatives may thus be produced in a very short time to thereby definitely establish the results of the exposure.

This process of development may be found to be very useful in producing quick results for newspaper work, for the quick delivery of photographs from an airplane while in flight during times of peace as well as in time of war, or for the explorer or scientist who is far from his laboratory base and who is desirous of obtaining positive results, especially when engaged in photographing unusual objects wherein the necessity of ascertaining the results of the exposure is of paramount importance.

Finally, the invention is characterized by providing a comparatively simple and relatively inexpensive portable receiving and developing receptacle of a compact form, which is readily removable as a light-proof unit from the camera and which in itself comprises suitable means to carry on the process of developing the film contained therein without requiring its removal from the receptacle, to the end that the operation may be performed in the field wherever and whenever it may be found desirable or convenient to quickly develop the films to prevent the deterioration or possible fading of the exposures on a film, and with these objects in view the invention consists in the novel construction and arrangement, and in the construction and combination of parts, of which the preferred embodiment is shown in the accompanying drawings, in which:

Fig. 1 is a perspective view of a conventional type camera carrying a film receiving receptacle constructed in accordance with the principles of our invention;

Fig. 2 is a cross-sectional view of the camera casing, showing the manner in which the film is fed into the receptacle;

Fig. 5 is a plan view of the assembly of the film receiving receptacle per se;

Fig. 6 is a plan view of the inner side of the lid of the receptacle, which same is provided with a light-tight vent;

Fig. 7 is a top plan view of the film receptacle with the lid removed;

Fig. 8 is a cross-sectional view of the film receptacle illustrating in detail the arrangement of the light trap in the base thereof;

Fig. 9 is a perspective view of the inner coiled section shown in a disassembled position;

Fig. 10 is a detail view in cross-section, illustrating the manner in which the inner coiled member of the film receptacle is anchored within the camera mounting;

Fig. 11 is a sectional view taken on the line 11—11 of Fig. 10;

Fig. 12 is an enlarged detail section of the shearing means provided in the receptacle illustrating the parts arranged in proper position for receiving the film therein; and Fig. 13 is a detail view similar to Fig. 12, illustrating the relative positions of the inner and outer members of the film receptacle after the film contained therein has been severed.

Referring more particularly to the drawings, wherein corresponding parts are designated by like numerals throughout the several views thereof, the numeral 10 represents the frame of a type of camera in connection with which our film container or receptacle is designed to operate, the said camera having the usual exposure field 11 and provided at one end, as shown in Fig. 2, with cooperating centering pins 12 and 13, upon which is detachably mounted a film spool carrying a film 14 which is movable across the said exposure field.

Figure 3:
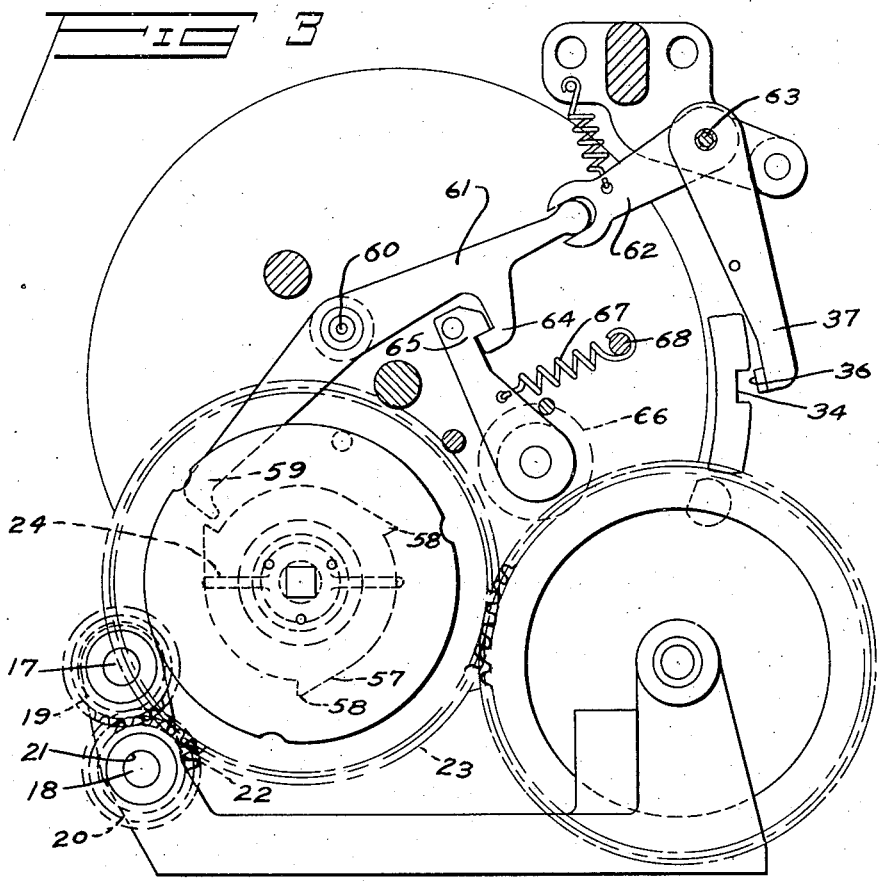
Fig. 3 is a side elevation of the film feed mechanism.

In carrying out the present invention use is made of the end plates 15 and 16 of the camera frame. Journalled upon these plates to extend transversely therebetween are co-acting feed rollers 17 and 18 geared one to the other by suitable pinions 19 and 20, as shown in Figs. 2 and 3. The shaft 21, upon which the roller 18 is carried, is also provided with a pinion 22, arranged to mesh with the driving gear 23 forming a part of the film feed mechanism of the camera which latter is shown generally in Fig. 3, the said driving gear being carried on the same shaft, with a manually operated knob 24, by means of which the driving gear 23 may be turned to rotate the roller 18 and thereby feed the film 14 between the said roller and the roller 17, the purpose of which will hereinafter be more fully set forth.

Disposed between the end plates 15 and 16 is a cylindrical shell 25 having its open end 26 projecting through the end plate 16 and forming a housing within which is adapted to be received a film container or receptacle generally indicated by numeral 27, which includes an outer cylindrical section 28 in which is telescopically fitted an inner cylindrical section 29. The section 28 is formed at its one end with a flange 30 which, as best seen in Fig. 1 of the drawings, lies flat against the adjacent side of the camera to terminate substantially flush with the outer face thereof.

Cooperating with the flanged end of the section 28 is a locking device comprising a spring loaded locking plunger 31 formed with a cam surface 32, which is engaged by the flanged end of the section 28 when reecived within the shell 25 to force the plunger 31 within its housing 33 until the section 28 has been properly positioned within the said shell. When once in position, the plunger 31 being normally under tension, is automatically released to retain the section fixed against accidental removal from the shell 25 and yet permit the said section to be retained in proper position within the said shell.

Formed in the flanged end of the section 28 and upon one side thereof is a notch 34 which when the section 28 is properly positioned within the shell 25 is adapted to register with a locking lug 36 formed on the end of a locking lever 37. To insure the section 28 being properly positioned with respect to the shell 25 a lug 38 is provided on the rear of the flanged end of the section 28 and then adapted to bear against a projection 39 formed on the outer face of the camera as will be noted in Fig. 4, so that when thus positioned the lug on the locking lever 37 may engage in the notch 38.

Consequently when the section 28 is correctly positioned within the shell 25 it will not only be locked against accidental removal from the camera, but will also be fixed against rotation with respect to the shell 25.

A plurality of longitudinally extending spaced ribs 40, mounted on the outer periphery of the section 28 are so disposed with respect to the shell 25 as to afford point contact between the shell and section 28 and thus reduce the friction therebetween to a minimum and allow the section to freely slide in and out of the shell when it is desired to remove the receptacle from the camera.

The inner cylindrical section 29 of the film container is then fitted into the section 28. The inner cylindrical section is provided on one side thereof, as will best be seen in Figs. 12 and 13 of the drawings, with a longitudinally extending film receiving slot 41, and as will be apparent the side section is snugly fitted into the section 28 so that light cannot readily enter between the said sections, in a like manner the outer cylindrical section 28 is formed with a film receiving slot 42 adapted to register with the slot 41 of the inner cylindrical section, and one wall thereof is formed to provide a longitudinally inclined cutting edge 43.

As more particularly shown in Figs. 12 and 13 of the drawings, the shell 25 is formed on the one side thereof with a longitudinally extending film receiving slot 44 with which the slots 41 and 42 respectively of the inner and outer cylindrical sections of the film receptacle are adapted to be registered. Disposed within the slot 44 and extending the full length thereof is a cutting blade 45. The bottom wall 46 of the shell 25 is provided with a centrally located anchor member 47 slotted at its outer end, as shown by numeral 48, to receive therein an anchor strip 49, carried in the lower end of the inner cylindrical section, as best illustrated in Fig. 10 of the drawings, so that when the inner section of the film container is fitted within the section 28, the longitudinal slot 41 will be registered with the slots of the outer cylindrical section and the film receiving slot 44 of the shell 25. It will thus be seen that with the slots of all sections registered, as best seen in Figs. 2 and 12 of the drawings, that the film 14 may be readily fed into the receptacle from the rollers heretofore mentioned.

The outer cylindrical section is suitably provided with a light-tight lid 50, which snugly fits within an annular recess 51 formed in the flanged end of the said outer section, the lid beng conveniently provided with a handle, as shown at 52.

Figure 4:
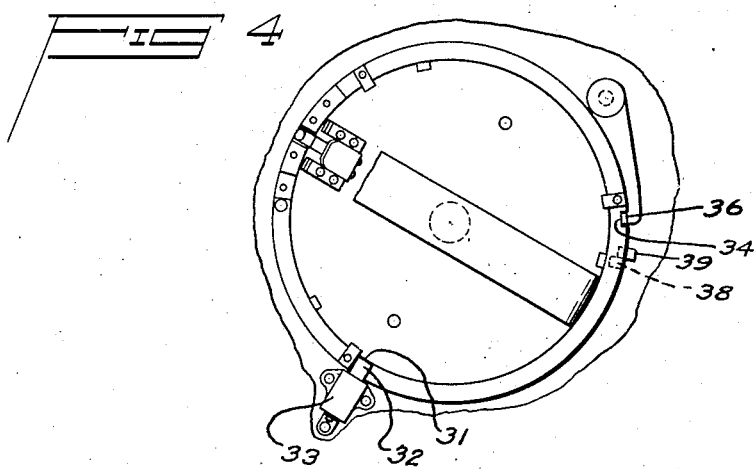
Fig. 4 is a top plan view of the film receptacle as mounted in the camera, which illustrates the mechanism shown in detail in Fig. 3 for retaining the receptacle in the camera.

Mounted upon the flanged end of the outer section 28, is a plurality of radially disposed locking lugs 53, the ends of which project beyond the edge of the annular recess 51, heretofore mentioned, whereby to be detachably engaged in suitable diametrically arranged notches 54 formed, as will be noted by referring to Fig. 4 of the drawings, around the peripheral edge of the lid 50.

The lid 50 is also provided with a spring actuated locking device generally indicated by numeral 55, adapted to be lockingly engaged with a suitable notched holding member 56 carried on the flanged end of the section 28, whereby to lock the lid tightly to the said section and form therewith a light-tight closure.

In the present application of the aparatus, means are provided for maintaining the film receptacle or container arranged with the film receiving slots in an operable position set forth until a predetermined length of film has been fed therein and with this object in view a cam 57 is provided which is mounted upon the shaft carrying the driving gear 23, heretofore mentioned ,and rotatable therewith. The cam 57, as will be noted by referring to Fig. 3 of the drawings, is formed with a plurality of lobes 58, with which the follower arm of a bell crank lever 59 pivoted to the end plate 15 of the camera, as shown at 60, is adapted to contact.

The free end 61 of the bell crank lever is operably engaged in the slotted end of a rocker arm 62 pivotally mounted upon a shaft 63 secured to the frame of the camera, said shaft carrying at its opposite end the locking lever 37 heretofore mentioned. The bell crank lever 59 is also formed with a locking arm 64, which engages with a latch 65 pivotally mounted to the camera, as shown. The latch, as best seen in Fig. 3 of the drawings, is adapted for manual operation, a knob 66 located on the outside of the camera, as shown in dotted line in Fig. 3, being provided, which is carried upon the shaft to which the latch 65 is secured, the latch being maintained in operative engagement with the locking arm of the bell crank lever by means of a coiled spring 67, which anchors at its one end to the latch aforementioned, the other end being suitably connected to the mounting strut secured to the frame of the camera as at 68.

Normally the inner cylindrical section 29 heretofore mentioned is arranged with its longitudinal film receiving slot 41 disposed in registry with the slot of the outer section. In this manner it will be apparent that film fed from the camera may be delivered through the said openings and into the inner cylindrical section edgewise and in a plane substantially tangent to the periphery of the said inner section. In the form of the invention herein illustrated, the inner cylindrical section is provided with a film holder or film suspending element, which generally comprises a thin flexible metallic plate 69 of a material which will not be injuriously affected by developing fluids. This film holding element or plate, as will be noted, is of coil formation used with the convolutions of the coil in spaced relation to each adjacent coil so as to afford a clearance therebetween in order that the film in being fed into the film holding element may travel in the spaces between the convolutions and be guided by the curved surface thereof. By choice the film is fed into the film holding element with the back or uncoated surface next to the side portion of the coil and when so introduced the coated surface of the film is not likely to come into contact with the adjacent convolutions of the coil, as the said film travels the circuitous path outlined by said convolutions. The plate may be held in the inner cylindrical section in any appropriate manner, as by brazing or the like, directly to the ends of the said section. The inner end of the coil is provided with a stop 70, as shown in Fig. 2, against which the film as it is being fed therein, is adapted to ultimately contact so that the said uncoated side of the film in following the curved surface is forced to hug the side walls of the film holding element by reason of its coiled condition.

From the description thus far taken in connection with the accompanying drawings it will be readily understood that with the film receiving receptacle correctly positioned in the camera with respect to the film receiving slot in the shell of the camera that the film 14 may readily be fed through the said slots and into the spaces between the convolutions of the film holding element. In the present instance the camera illustrated is of a type in which the exposure field, as will be noted by referring to Fig. 2 of the drawings, is at a substantial distance from the film container shown in cross-section. As a result, therefore, of this construction it is necessary that the film container be retained in place in the camera until the exposed portion of the film located between the edge of the exposure field and the inside of the container and herein designated by numeral 71, which incidentally includes a portion of the last exposure made, is fed into the container, otherwise it can be readily understood that it would be quite impossible to inadvertently sever a portion of the exposed film or a portion of the picture and thus destroy its usefulness. With this thought in view, it is necessary on the part of the operator to manually feed the portion 71 of the film into the film receptacle prior to severing the said portion from the remaining film roll, which is accomplished by turning the knob 24, the operation of which will actuate the feed rollers 17 and 18 and feed the exposed portion 71 into the said container until the end of the film contacts against the stop 70 provided on the inner end of the coiled holding plate 69.

At the same time operation of the mechanism heretofore described will simultaneously cause the lobes 59 of the cam 57 to contact with the follower arm of the bell crank lever 59, and the locking lever 37, as will be noted by referring to the drawings, will be actuated to lift the locking lug 36 clear of the notch 34.

Attention is now directed to the fact that with the locking lever in the unlocked position shown in Fig. 3 of the drawings, the outer cylindrical section 28 of the film receptacle may be rotated relative to the inner section 29, which at this time is anchored against rotational movement and also with respect to the shell 25 of the camera, approximately 90 degrees, or until the notch 34 is in registry with the edge of the locking plunger 31 and when so registered the receptacle is in a position to permit of its removal from the camera.

Assuming, therefore, that it is desired to remove the exposed portion of the film from the camera, the handle of the film receptacle is grasped and given a quarter-turn to the right in order to bring the notch 34 into registry with the edge of the locking plunger so that the receptacle may be withdrawn. This movement will simultaneously rotate the outer cylindrical section 28 with respect to the section 29 and the shell 25 respectively and, as best shown in Figs. 12 and 13 of the drawings, will cause the cutting edge 43 of the slot 41 to move relatively past the cutting blade 45, shear the film 14 and thus free the exposed portion of the film within the film receptacle. In this connection, it will be observed that the edge of the cutting blade 45, disposed within the film receiving slot 25, is arranged slightly in advance of a plurality of metallic fingers 72 suitably secured to the film holding plate 69, as by brazing, as may best be seen in Figs. 12 and 13, whereby to prevent the severed end of the exposed film within the container, by reason of its coiled condition, from unwinding.

It will, therefore, be seen that by shifting the section 28 in the manner prescribed the exposed portion of the film in the container will be automatically cut off, while at the same time the complemental sections 28 and 29 of the film receptacle will be moved relative to one another to dispose the film receiving slots out of registry as shown in Fig. 13, to close the receptacle with respect to the interior of the camera in order that the film receptacle containing the exposed portion of photographic film may be readily removed from the camera without likelihood of any light reaching the unexposed portion of the film within the film receptacle. Consequently, the exposed portion of the film may be cut off and removed from the camera in daytime or in the light.

The present invention contemplates not only construction of a light-proof film receptacle for containing exposed lengths of photographic film, but furthermore to provide in such receptacle means to permit the exposed portion of film to be readily and quickly developed while contained in said receptacle without likelihood of any light reaching the film and yet permit of rapid ingress and egress of the developing solutions into and out of said receptacle and with this object in view, as will be noted by referring to Figs. 8 and 10 of the drawings, the outer cylindrical section 28 of the receptacle is provided with a light-tight partitioned opening which consists of a series of vertically arranged baffle plates 73 secured to the bottom wall 74 of the said section, as by brazing or the like, each plate projecting inwardly to a diameter common to all of said plates and each being arranged at an angle to its next adjacent plate, as best seen in Fig. 11 of the drawings. Intermediate of said baffle plates the lower end of the outer wall of the section 28 is cut away as shown by numeral 75, to provide openings having communication with the spaces occurring between the walls of said baffle plates.

Disposed immediately above said plates and cooperating therewith is provided a plurality of circular disks spaced relative to one another, which latter are suitably secured to the inner wall of the section 28, as by brazing or the like. As will be noted these disks, of which in the present illustrative case there are four in number, are, for the purpose of illustration, designated by numerals 76, 77, 78 and 79 respectively. As will be noted the disks 76 and 78 are each provided with annular openings 80 located adjacent the center of section 28, while the disks 77 and 79 are formed with similar openings 81, which are located adjacent the outer periphery of the section 28 and as is apparent are disposed out of registry with the openings in the disks 76 and 78. Cooperating with the light trap in the bottom of the outer section 28 is a plurality of openings 82 located in the bottom end of the inner section 29 and so disposed relative to the film holding element 69 as to lie intermediate the convolutions of its coiled sides.

Assuming now that it is desired to develop the exposed portion of film in the film receptacle, the handle of the said receptacle is grasped and the receptacle may then be lowered into suitable tanks, (not shown) containing the developing solution and, as shown by arrows 83 in Fig. 8, the solution may readily enter the interior of the container and into contact with the coated suface of the film contained therein. As a result of the arrangement of baffles mounted in the bottom of the receptacle it can be readily understood that while the developing solutions are capable of quick ingress and egress into and out of the interior of the container, light rays are readily deflected and prevented from penetrating into the interior of the inner section 29 and striking the exposed portions of the film. As will be noted by referring to Fig. 6, the lid 50 of the receptacle is suitably provided with a light-tight vent 84, which permits the air trapped on the inside of the receptacle to readily escape when the said receptacle is lowered into the developing solution. In this manner the said receptacle may be quickly lowered into and withdrawn from the developing solution in order that the uniformity of the action of the developer solution will be most pronounced.

To facilitate removal of the film after being developed, the inner cylindrical section is formed of two separable half portions 85 and 86, as shown in Fig. 9. In this manner the film, as is readily apparent, may be easily removed without the likelihood of the emulsion being scratched or marred in any manner or form.

We claim:

1. A readily removable container adapted to be disposed in a camera, comprising in combination, a dark chamber for receiving and developing exposed portions of photographic film strips while in said container, a helical coil member disposed within said dark chamber into which the film strip is adapted to be received in coil form with spaces between the adjacent convolutions of said coil, said container being provided with light-excluding passages to permit the rapid ingress and egress of developing solutions into or out of said dark chamber and helical member having a series of fluid passages cooperating with the passages in said container to permit the developing solution to be readily accessible to the emulsion side of said film strip when contained in said helical coil member.

2. A readily removable photographic film developing container adapted to be disposed in a camera, comprising in combination a cylindrical receptacle having a dark chamber, a coil-form film holder in said dark chamber for receiving and supporting said film in coiled formation therein, and said container having light-excluding means comprising a partitioned opening to permit rapid ingress and egress of developing solutions into and out of said cylindrical receptacle said film holder being so constructed and arranged as to permit said film contained therein to be freely subjected to the chemical action of said developing solution while secured in said film holder.

3. A photographic film developing container adapted to be removably disposed in a film camera, comprising a cylindrical receptacle having a dark chamber, a coil-form film holder in said dark chamber for receiving and supporting said film in coiled form therein, and light-excluding means comprising a partition opening to permit rapid ingress and egress of developing solutions into and out of said cylindrical receptacle said coil-form film holder being so constructed and arranged that the film contained therein will be freely subjected to the chemical action of said developing solution while secured in said film holder, the partitions in said opening forming baffles adapted to prevent light rays from penetrating into the interior of said receptacle.

4. A photographic film developing container comprising two complemental members, one of said members being adapted to telescope within the other member, said members having registerable openings into which the film to be developed is adapted to be fed, the inner member comprising film supporting means having convolutions to receive and coil the film therein when fed into said supporting means, the other member being rotatable relative to the inner member whereby to close the registrable openings to render the container light-proof, and vent means comprising a partitioned opening in said outside member and cooperating with said inner member to permit ingress or egress of developing solutions into and out of said inner member whereby to permit said film supported therein to be freely subjected to the chemical actions of developing solution while supported in said film holder, the partitions in said opening forming baffles so constructed and arranged as to prevent the light rays from penetrating into the interior of said container.

5. A photographic film developing container comprising an outer cylindrical casing and an inner cylindrical casing adapted to telescope within the outer casing, a light-proof closure for the open end of said outer casing, said inner and outer casings having registerable openings provided in their side walls into which the film to be developed is adapted to be received, the inner casing comprising a coil-form film holder having convolutions for receiving and coiling the film therein, the outer casing being rotatable relative to the inner casing to thereby render the container light-tight and light-proof vent means to permit the rapid flow of developer solutions into and out of the inner casing comprising a partitioned opening in the bottom of said outer casing and openings in the bottom of said inner casing communicating with the partitioned opening in said outer casing, the partitions in said opening being so constructed and arranged as to prevent light rays from penetrating into the interior of said container.

6. A photographic film container as set forth in claim 5, characterized by the inside casing being formed into two separable half portions to thereby permit the film contained therein to be readily removable.

7. A film camera, comprising in combination a light-tight means for receiving and supporting an exposed portion of a film strip, said means being adapted to be bodily removable from said camera, and shearing means mounted in and forming a part of said camera said film receiving means being shiftable relative to said shearing means to sever from the film strip in said camera the exposed portion thereof delivered into said receiving means.

8. A film camera, comprising in combination, a relatively fixed casing, having an opening through which the film is fed out of said camera, light-tight means mounted in said casing for receiving and supporting the film fed out of said camera, said receiving means being bodily removable from said camera casing, and shearing means carried by said casing, said film receiving means being shiftable relative to said shearing means to sever from the film strip in said camera the exposed portion thereof delivered into said receiving means.

9. A film camera, comprising in combination, a relatively fixed casing having an opening through which the film is fed out of said camera, a light-tight receptacle mounted in said casing and having an opening for receiving the film fed out of said camera opening, said receptacle being bodily removable from said camera casing, and shearing means disposed within the opening in said casing said film receiving receptacle being shiftable relative to said shearing means to sever from the film strip in said camera the exposed portion thereof delivered into said receptacle.

10. A film camera comprising in combination, a relatively fixed casing provided with film shearing means, a light-tight receptacle mounted within said casing for receiving an exposed portion of a film strip fed out of said camera, said receptacle comprising an inner and an outer section, means for holding one of said sections stationary, and means for shifting the other section relative to the fixed section whereby said receptacle will operate to actuate said shearing means to sever the portion of film received in said receptacle from the film strip in said camera.

11. A film camera, comprising in combination, a relatively fixed casing provided with an opening through which a film strip is adapted to be fed out of said camera, shearing means carried by said casing and disposed within said opening, a light-tight receptacle mounted within said casing, said receptacle comprising an inner and an outer section, each having a slotted registerable opening adapted to be registered with the opening in said casing and receive portions of film strip fed out of said camera, one of said sections having a locking member to hold said one section stationary relative to said casing when the slotted opening of said one section is aligned with said casing opening, and means for shifting the other section relative to said fixed section and to said casing respectively whereby to effect a relative movement between the openings in said section and actuate said shearing means to sever the portion of said film received therein and to simultaneously move the openings in said inner and outer sections out of register.

12. In a film camera having a cylindrical casing provided with a longitudinal opening through which a film strip is adapted to be fed out of said camera, shearing means carried by said casing and disposed within said opening, a light-tight receptacle adapted to be received within said casing, said receptacle comprising an inner and and outer cylindrical section, said sections being provided in their sides with longitudinally disposed registerable openings adapted to register with the opening in said cylindrical casing and receive portions of film fed out of said camera, the inner cylindrical section having a locking member to make said section stationary relative to said casing when the opening in said inner section is aligned with said casing opening, and means for rotating the outer cylindrical section relative to said fixed inner section and to said casing respectively whereby to cause the wall of the opening in said casing and said severing means to relatively move past one another to sever the portion of film received in said receptacle from film in said camera and to simultaneously move the openings in said inner and outer sections out of register and permit said receptacle to be bodily removed from said casing as a light-proof unit with the severed film portion enclosed therein.

13. In a film camera, a casing having an opening through which the film is fed out of said camera, a light-tight receptacle mounted in said casing for receiving and supporting the film fed out of said camera, said receptacle being bodily removable from said camera casing, shearing means carried by said casing and cooperating with said film receiving receptacle to sever from the film strip in said camera the exposed portion thereof delivered into said receptacle, and locking means for retaining said receptacle within said casing and adapted to permit removal of said receptacle from the casing only when said receptacle is light-tight.

14. In a film camera, a casing having an opening through which film is fed out of said camera, a light-tight receptacle mounted in said casing for receiving and supporting the film fed out of said camera, said receptacle being bodily removable from said camera casing, shearing means carried by said casing and cooperating with said film receiving means to sever from the film strip in said camera the exposed portion thereof delivered into said receiving means, and locking means associated with said camera casing and cooperating with said receptacle for retaining said receptacle within said casing and adapted to permit removal of said receptacle from said casing only when said receptacle is light-tight.

15. In a film camera having a cylindrical casing provided with a longitudinal opening through which a film strip is adapted to be fed out of said camera, shearing means carried by said casing and disposed within said casing opening, a light-tight receptacle mounted in said casing, said receptacle comprising an inner and an outer cylindrical section, each section being provided in their sides with longitudinally disposed registerable openings adapted to be registered with the opening in said casing and receive portions of film fed out of said camera, the inner cylindrical section having a locking member to hold said section stationary relative of said casing when the opening in said inner section is aligned with said casing opening, the said outer section being shiftable relative to said inner section and camera casing, and means for holding said outer section against rotation relative to said camera casing, said holding means being adapted to be releasable and permit rotation of said outer section after a predetermined length of film is received in said receptacle whereby shifting of said outer section relative to said camera casing actuates said shearing means to sever the enclosed film from the film strip in said camera and to simultaneously dispose the section openings out of register.

16. In a film camera having a cylindrical casing provided with a longitudinal opening through which a film strip is adapted to be fed out of said camera, shearing means carried by said casing and disposed within said opening, a light-tight receptacle mounted in said casing, said receptacle comprising an inner and an outer cylindrical section, each section being provided in their sides with longitudinally disposed registerable openings adapted to be registered with the opening in said casing and receive portions of film fed out of said camera, the inner cylindrical section having a locking member to hold said section stationary relative to said casing when the opening in said inner section is aligned with said casing opening, the outer section being shiftable relative to said inner section and camera casing, means for holding said outer section against rotation relative to said camera casing, said holding means being adapted to be releasable and permit rotation of said outer section only after a predetermined length of film is received in said receptacle whereby shifting of said outer section relative to said camera casing actuates said shearing means to sever the enclosed film from the film strip in said camera and to simultaneously dispose the section openings out of register and locking means for retaining said receptacle within said casing and adapted to permit removal of the receptacle from the casing only when said receptacle is light-tight.

17. In a film camera having a cylindrical casing provided with a longitudinal opening and having a film feeding mechanism adapted to feed exposed portions of film through said opening, a light-tight receptacle mounted in said casing, said receptacle comprising relatively movable sections disposed one within the other and having registerable openings into which the film in said camera is fed, holding means for locking the section of said section against relative movement when the openings therein are registered, and manually operated means for feeding a predetermined length of film into said receptacle, said means operating to automatically release said holding means and to thereby permit said sections to be relatively moved and dispose said openings out of register.

18. In a film camera having a cylindrical casing provided with a longitudinal opening and having a film feeding mechanism adapted to feed exposed portions of film through said opening, shearing means carried by said casing and disposed within said opening, a light-tight receptacle mounted within said casing, said receptacle comprising relatively movable cylindrical sections disposed one within the other and having registerable openings adapted to be registered with the opening in said casing and receive the exposed portions of film fed therethrough, the inner section having a locking member to hold said section stationary relative to said casing when the opening in said inner section is aligned with the opening in said casing, holding means for normally locking said outer section against movement relative to said inner section and casing when all of the openings are disposed in register and manually operated means actuated independently of said feed mechanism for feeding a predetermined length of film into said receptacle, said means operating to automatically release said holding means and to thereby permit said outer section to be rotated relative to said inner section and said casing and co-act with said film shearing means to sever the enclosed film from the film strip and to dispose the openings in said inner and outer sections out of register for the purpose set forth.

19. In a film camera having a cylindrical casing provided with a longitudinal opening and having a film feeding mechanism adapted to feed exposed portions of film through said opening, shearing means carried by said casing and disposed within said opening, a light-tight receptacle mounted within said casing, said receptacle comprising relatively movable cylindrical sections disposed one within the other and having registerable openings adapted to be registered with the opening in said camera casing and receive the exposed portions of film fed therethrough, the inner section having a locking member to hold said sections stationary relative to said casing when the opening in said inner section is aligned with the opening in said casing, holding means for normally locking said outer section against movement relative to said inner section and the casing when all of the openings are disposed in register, manually operated means actuated independently of said feed mechanism for feeding a predetermined length of film into said receptacle, said means operating to automatically release said holding means and to thereby permit said outer section to be rotated relative to said inner section and said casing and co-act with said film shearing means to sever the enclosed film from the film strip and to dispose the openings in said inner and outer section out of register, and locking means carried by said camera and cooperating with said receptacle for retaining said receptacle within said casing and adapted to permit removal of the receptacle from said casing only when said receptacle is closed and rendered light-tight.

20. A container adapted to be disposed in a camera comprising, an inner and an outer casing to provide a dark chamber for receiving and developing the received portions of photographic film while contained therein, said casings having registerable openings to receive the film and being shiftable relative to one another to move the openings out of registry so as to exclude light from the portions of photographic film received within said casings, said container being provided with light excluding passages having communication with said dark chamber and being so constructed and arranged that rapid ingress and egress of developing solutions into or out of said chamber will be readily effected and light rays will be excluded therefrom.

21. A container adapted to be disposed in a camera comprising, an inner and an outer casing to provide a dark chamber for receiving and developing the received portions of photographic film while contained therein, said casings having registerable openings to receive the film and being shiftable relative to one another to move the openings out of registry so as to exclude light from the portions of photographic film received within said casings, said container being provided with passages having communication with said dark chamber so constructed and arranged that rapid ingress and egress of developing solutions into or out of said dark chamber will be effected and light excluding means disposed between said passages and said dark chamber adapted to prevent the penetration of light rays into said dark chamber.

22. A container adapted to be disposed in a camera comprising, an inner and an outer casing to provide a dark chamber for receiving and developing the received portions of photographic film while contained therein, said casings having registerable openings to receive the film and being shiftable relative to one another to move the openings out of registry so as to exclude light from the portions of photographic film received within said casings, said container being provided with passages having communication with said dark chamber so constructed and arranged that rapid ingress and egress of developing solutions will be effected and partitions disposed in said passages constructed in a manner such that light rays are prevented from penetrating into said dark chamber through said passages.

23. A container adapted to be disposed in a camera comprising, an inner and an outer casing to provide a dark chamber for receiving and developing the received portions of photographic film while contained therein, said casings having registerable openings to receive the film and being shiftable relative to one another to move the openings out of registry so as to exclude light from the portions of photographic film received within said casings, one of said casings comprising a receptacle having an open end and a light-tight, removable closure therefor, and light excluding passages in the other end of said receptacle to permit the rapid ingress and egress of developing solutions into or out of the interior of said receptacle when said receptacle is bodily submerged and withdrawn from said developing solutions.

24. A container adapted to be disposed in a camera comprising, an inner and an outer casing to provide a dark chamber for receiving and developing the received portions of photographic film while contained therein, said casings having registerable openings to receive the film and being shiftable relative to one another to move the openings out of registry so as to exclude light from the portions of photographic film received within said casings, the outer casing comprising a receptacle having an open end for receiving said inner casing and a light-tight, removable closure in the upper end thereof having a vent opening and means in the lower end of said receptacle to permit rapid ingress or egress of developing solutions into and out of the interior of said receptacle, said means comprising partitioned openings communicating with the interior of said receptacle, the partitions in said openings forming baffles constructed in a manner such that light rays are prevented from penetrating into the interior of said receptacle.

25. A container adapted to be disposed in a camera comprising, an inner and an outer casing to provide a dark chamber for receiving and developing the received portions of photographic films while contained therein, said casings having registerable openings to receive the film and being shiftable relative to one another to move the openings out of register so as to exclude light from the portions of photographic film received within said casings the inner casing being formed of a plurality of separable sections.

26. A cylindrical film holder comprising, a casing of coil formation, the convolutions of the coil being spaced from one another for receiving and coiling a film strip, the end of the inner convolution of said film holder being formed with a stop against which the inner end of said coiled film strip is adapted to contact, the end of the outer convolution of said film holder forming with its next adjacent convolution an opening for receiving the film strip and stops positioned adjacent said opening, against which the outer end of said film strip is adapted to bear to prevent said film strip from unwinding by reason of its coiled condition.

27. A film holder of the type set forth in claim 26, said casing being characterized by being formed of separable sections to permit the film strip retained therein to be readily removable.

28. A film camera of the type set forth in claim 10, the outer section being characterized by being provided with a film receiving opening, the inner section of said receptacle being characterized by being of coil formation, the convolution of said coil being spaced from one another for receiving and coiling a film strip, the end of the inner convolution being formed with a stop against which the inner end of said coiled film strip is adapted to contact, the end of the outer convolution of said inner section forming with its next adjacent convolution an opening adapted for registry with the opening in said outer section for receiving the film strip and stops positioned adjacent the film receiving opening in said inner section against which the outer end of said film strip is adapted to bear when severed by said shearing means.

29. A film camera comprising in combination, a light-tight means for receiving and supporting an exposed portion of a film strip, said means being adapted to be bodily removable from said camera, and shearing means mounted in said camera cooperating with said film receiving means to sever from the film strip in said camera the exposed portion thereof delivered into said receiving means, said film receiving means being provided with light-tight vents so constructed and arranged as to permit developer solutions to readily penetrate into and drain therefrom when said means is submerged or withdrawn from said solutions.

30. A film camera, comprising in combination, a relatively fixed casing having an opening through which the film is fed out of said camera, light-tight means mounted in said casing for receiving and supporting the film fed out of said camera, said receiving means being bodily removable from said camera casing and being provided with light excluding passages arranged in such a manner as to permit developer solutions to rapidly penetrate into or drain from the interior thereof when submerged in or withdrawn from said solutions, and shearing means carried by said casing and cooperating with said film receiving means to sever from the film strip in said camera the exposed portion thereof delivered into said receiving means.

31. A film camera, comprising in combination, a relatively fixed casing having an opening through which the film is fed out of said camera, a light-tight receptacle mounted in said casing and having an opening for receiving the film fed out of said camera opening, said receptacle being bodily removable from said camera casing and being provided with light excluding passages so constructed and arranged as to permit developer solutions to rapidly enter or drain from the interior thereof when submerged in or withdrawn from said solutions, and shearing means disposed within the opening in said casing and cooperating with said film receiving receptacle to sever from the film strip in said camera the exposed portion thereof delivered into said receptacle.

ALBERT W. STEVENS.
WILLIAM H. RICHARDS.